(12) United States Patent
Zakas et al.

(10) Patent No.: US 11,531,665 B2
(45) Date of Patent: Dec. 20, 2022

(54) AUTOMATED DATABASE INDEX MANAGEMENT

(71) Applicant: Capital One Services, LLC, McLean, VA (US)

(72) Inventors: Emily Zakas, Tysons, VA (US); Matthew Guy de Ganon, McLean, VA (US); Christina Brainard, New York, NY (US); Sudheesh Kamath Sukumar Kamath, Scotch Plains, NJ (US)

(73) Assignee: Capital One Services, LLC, McLean, VA (US)

( * ) Notice: Subject to any disclaimer, the term of this patent is extended or adjusted under 35 U.S.C. 154(b) by 201 days.

(21) Appl. No.: 16/869,078

(22) Filed: May 7, 2020

(65) Prior Publication Data
US 2021/0349874 A1 Nov. 11, 2021

(51) Int. Cl.
*G06F 7/00* (2006.01)
*G06F 16/22* (2019.01)
*G06N 5/04* (2006.01)
*G06N 20/00* (2019.01)

(52) U.S. Cl.
CPC ........... *G06F 16/2272* (2019.01); *G06N 5/04* (2013.01); *G06N 20/00* (2019.01)

(58) Field of Classification Search
CPC ....... G06F 16/2272; G06N 20/00; G06N 5/04
USPC .................................................. 707/600–899
See application file for complete search history.

(56) References Cited

U.S. PATENT DOCUMENTS

| | | | |
|---|---|---|---|
| 6,728,720 B1 | 4/2004 | Lenzie | |
| 7,644,066 B2 | 1/2010 | Krishnaprasad et al. | |
| 8,489,565 B2 | 7/2013 | Balasubramanian et al. | |
| 9,454,570 B2 | 9/2016 | Clevenger | |
| 2017/0300517 A1 | 10/2017 | Amirsoleymani et al. | |
| 2020/0401598 A1* | 12/2020 | Mehrotra | G06F 16/217 |

* cited by examiner

*Primary Examiner* — Isaac M Woo
(74) *Attorney, Agent, or Firm* — Sterne, Kessler, Goldstein & Fox P.L.L.C.

(57) ABSTRACT

A database index management system uses one or more machine learning models to analyze a query log in relation to a database. A machine learning model may identify a query pattern and/or a change in the query pattern from the query log, identify a column associated with the query pattern, and identify an addition, removal, or modification of an index related to the identified column. The database index management system may perform one or more additions, removals or modifications of indices of the database based on query patterns identified in the query log. The database index management system continuously improves database performance in response to changing database usage patterns over time.

18 Claims, 5 Drawing Sheets

AUTOMATED DATABASE INDEX MANAGEMENT

BACKGROUND

Databases are large collections of data, typically accessible by a computer. A relational database may include multiple tables, each table having a number of records, and each record having one or more fields. Tables of a database may also be conceptualized as rows and columns of data. Data may be retrieved from a relational database by a query identifying records with relational operators. A computer may search the records of a relational database to identify all records that match the query. In order to improve the speed of searching database records, one or more fields of a table may be indexed. The selection of which field to index and the type of index to assign to the field can impact database performance, and different indices and index types may perform better or worse depending on the queries that are performed on the database. One task of database administrators is to identify which fields should be indexed. The fact that database usage can change over time makes the task of identifying an optimal index more difficult.

BRIEF SUMMARY

A method of modifying an index of a table in a relational database includes identifying one or more columns of the table, receiving a query log listing two or more queries performed on the table, analyzing the query log using a machine learning model to identify, among the one or more columns, a column for which an index is to be added, removed or modified, and adding, removing, or modifying the index for the identified column.

Adding, removing, or modifying the index for the identified column may include one or more of adding an index to the identified column, removing an index from the identified column, adding a multi-column index using the identified column and another column of the table, changing an index of the identified column to a hash index, changing the index of the identified column to a generalized search tree index or changing the index of the identified column to a binary tree index.

Analyzing the query log to identify the column may include using the machine learning model to identify a query pattern for the table based on historical queries, using the machine learning model to identify a change in the query pattern based on the query log, and setting, as the identified column, a column corresponding to the change in the query pattern.

Analyzing the query log to identify the column for which an index is to be added, removed, or modified may include identifying an addition, removal, or modification that improves database performance, based on the change in the query pattern. Database performance may be improved by reduced query execution time or reduced database size.

The change in the query pattern may include one or more queries of the query log performing a join or a filter operation on the table at the identified column, and adding, removing, or modifying the index may include adding an index to the identified column.

The change in the query pattern may include one or more queries of the query log performing a join or a filter operation on the table at the identified column and another column of the table, and adding, removing, or modifying the index may include adding a multi-column index using the identified column.

The change in the query pattern may include an increase in queries performing a join or a filter operation on the table at the identified column and a decrease in queries performing a join or a filter operation on an indexed column of the table. Adding, removing, or modifying the index may include removing an index from the indexed column and adding an index to the identified column.

The change in the query pattern may include a decrease in queries performing a join or a filter operation on the table at the identified column, and adding, removing, or modifying the index may include removing an index from the identified column.

The change in the query pattern may include one or more queries of the query log selecting records from the table based on an exact match between an expression and the records at the identified column, and adding, removing, or modifying the index may include changing the index to a hash index.

The change in the query pattern may include one or more queries of the query log selecting records from the table based on a partial match between an expression and the records at the identified column, and adding, removing, or modifying the index may include changing the index to a binary tree index.

In some embodiments, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

In a relational database, data may be arranged in tables with records arranged in rows and columns. Each record may be viewed as a row of data that are related to each other in some way and columns may correspond to a particular variable or data item of the records. In order to increase the speed and efficiency of database searches, certain columns may be indexed to allow records matching search criteria to be more rapidly identified. Because indexing columns in a database increases database size, selecting columns to index is done carefully to provide improvements in performance without excessive increases in size. As a non-limiting example, a table that cannot be completely stored in RAM, as a result of too many indices, may require access to a disk drive, which is much slower than accessing RAM. The decision of what improvements are worth an amount of increase in database size may be made based on many considerations specific to the database, its usage, and availability of resources.

One issue that arises in the management of large databases is that usage of the database may change over time. As usage changes, performance improvements enabled by the indexing of certain columns may be diminished. As usage changes, performance improvements may be possible through changing, adding, or deleting one or more indices of the database. The systems and methods described herein enable automated adding, removing, or changing of indices in a database in response to changing usage patterns.

Figure 1:
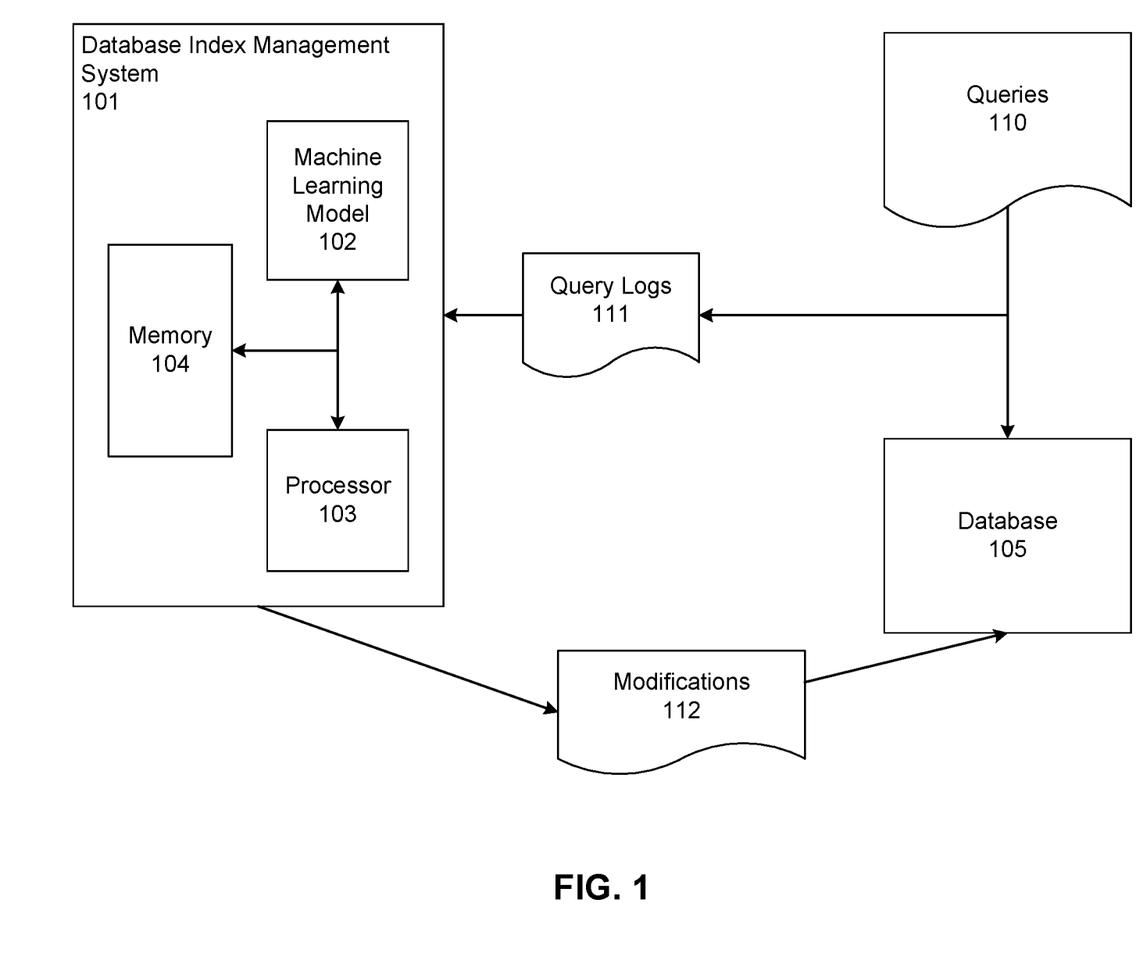
FIG. 1 is a block diagram of a database index management system according to some embodiments disclosed herein.

The database index management system 101 may be configured to monitor logs of queries performed on the database. The query log may include information about the columns queried, tables joined, matching parameters, and query execution time. A query log may provide the database index management system 101 with the information necessary to identify changing query patterns and potential performance improvements. In one non-limiting example, the query log may include queries with an exact match between an expression and the values in a column having a binary tree index. Because an exact match performs better on a hash index than a binary tree index, this kind of mismatch between the query and the index can indicate a potential performance improvement. As the database index management system 101 identifies performance improvements that may result from changing indices or changing index types, the system may change one or more indices to improve database performance.

FIG. 1 is a block diagram of a database index management system 101 according to some embodiments disclosed herein.

A database index management system 101 may include a machine learning model 102, a processor 103, and a memory 104. The database index management system 101 may monitor a database 105 and perform modifications 112 on the database 105. The modifications 112 performed on the database 105 may include adding, removing or modifying an index for a table of the database 105. The database index management system 101 may use a query log 111, including one or more queries 110 performed on the database, to determine what modifications 112 should be performed on the database 105.

Machine learning models suitable for the disclosed embodiments may include, for example and without limitation, supervised learning, semi-supervised learning, unsupervised learning, or reinforcement models. Supervised learning models may be trained on labeled data, where example conditions associated with a desired output are fed to the machine learning model during training. In relation to the disclosed embodiments, a database administrator's action queries that add or remove an index in response to patterns in the query log 111 may be a source of labeled data. Some non-limiting examples of supervised learning models include, for example and without limitation, nearest neighbor, naïve Bayes, decision trees, support vector machines, neural networks, or any machine learning algorithm suitable for classification problems.

As a non-limiting example of a source of labeled training data, action queries where a database administrator (DBA) added or removed an index may be used as a basis for selecting a subset of queries from the query log 111. Queries may be generated by database users and sent to the database in the form of structured query language (SQL) statements or another computer language. The database may record these queries in the query log along with their execution times and any other metadata related to the executing the queries. Queries that included a column to which an index was added or removed through a DBA's action query may be separated from the log and used as labeled training data for the machine learning model 102. This labeled training data may be useful in both supervised learning and semi-supervised learning models.

Semi-supervised learning models may be trained on data that is partially labeled. Query log 111 may include some queries that are associated with an action query that adds, removes, or modifies an index, and other queries that are not associated with an action query. Semi-supervised learning models may include classification type or clustering type machine learning models. Semi-supervised learning models may be useful in identifying potential modifications 112 or optimizations that database administrators (DBAs) did not detect. Semi-supervised machine learning models of the disclosed embodiments may include, for example and without limitation, generative models, low-density separation methods, graph-based methods, or heuristic methods.

Unsupervised machine learning models may be trained using unlabeled data. Unsupervised machine learning models may be used for pattern mining, for example and without limitation. In relation to the disclosed embodiments, unsupervised machine learning models may be used to identify patterns in the query log 111 that are not found by human DBAs. Unsupervised machine learning models may include, for example and without limitation, cluster analysis and/or principal component analysis. Some non-limiting examples of unsupervised machine learning algorithms that may be applicable to the disclosed embodiments include hierarchical clustering, k-means clustering, mixture models, density-based spatial clustering of applications with noise (DBSCAN), ordering points to identify the clustering structure (OPTICS), local outlier factor, or neural networks such as autoencoders, deep belief nets, Hebbian learning, generative adversarial networks, or self-organizing maps.

Reinforcement machine learning models may be trained by providing a feedback mechanism through a reinforcement signal. In relation to the disclosed embodiments, a reinforcement signal may comprise a reduced database size and/or a reduced query execution time in response to modifications 112 made to a database to add, remove, or modify a column for a table of the database 105. Some non-limiting examples of reinforcement machine learning models suitable for implementation in relation to the disclosed embodiments comprise Q-learning, temporal difference, deep adversarial networks, criterion of optimality, brute force, value function, Monte Carlo, and/or direct policy search.

According to some embodiments, the database index management system 101 may also include the database 105 for which an index is modified.

Figure 2:
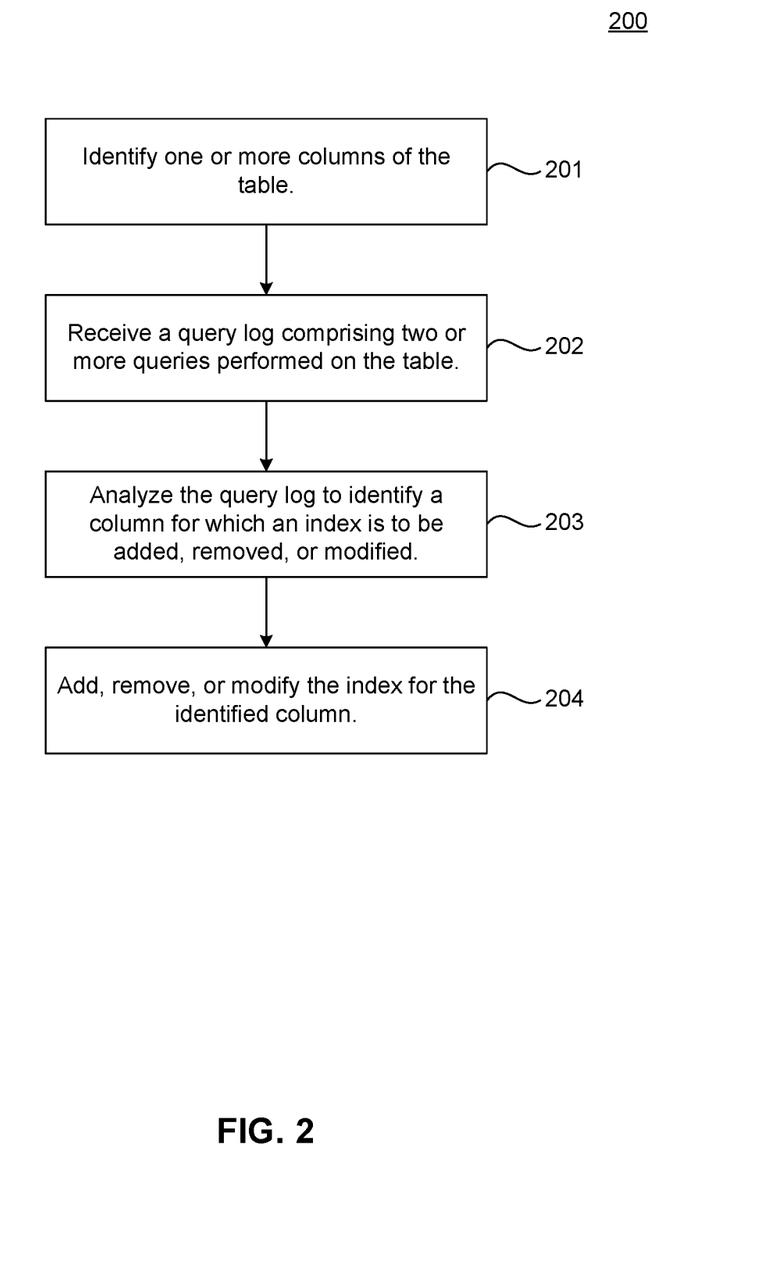
FIG. 2 is a flow chart illustrating a non-limiting process for database index management according to some embodiments disclosed herein.

FIG. 2 is a flow chart illustrating a non-limiting process for database index management according to some embodiments disclosed herein.

At step 201, the database index management system 101 may identify one or more columns of a table in the database 105. In a non-limiting example database, rows of a table may represent records, and columns of the table may represent fields of the records. The database index management system 101 may identify the one or more columns of the table by reading the table from the database 105, or by reading a description of the table.

At step 202, the database index management system 101 may receive a query log 111. The query log 111 may include one, two, or more queries that were performed on the table. The query log 111 may be filtered or processed to include a subset of the queries performed on the database 105. According to some embodiments, the subset of queries may comprise queries performed within a defined period of time. According to some embodiments, the subset of queries may be filtered to queries that exceed an execution time threshold. In this way, the database index management system 101 may reduce machine learning model training time and limit the addition, removal, or modification of indices to columns where a minimum performance gain can be achieved.

At step 203, the database index management system 101 may analyze the query log to identify, among the one or more columns, a column for which an index is to be added, removed, or modified. An index may include the data, from the column, organized in a structured manner that reduces search times. A column which is frequently used to uniquely identify records or ranges of records in a database may benefit from an index because the organized structure of the index allows the records matching a query to be more quickly identified. The type of structure used to organize an index may depend upon the type of queries that are performed on the indexed column. As a non-limiting example, partial-match queries perform better on a binary tree index than a hash index and exact match queries perform better on a hash index than a binary tree index. A Generalized Search Tree (GiST) index may be most appropriate for columns of a spatial data type.

The column identified based on analyzing the query log may be a non-indexed column or an indexed column. The identified column may be a column on which the queries in the query log are frequently performed, but which is not indexed. The identified column may be a column on which queries in the query log are infrequently performed, but which is indexed. The identified column may be a column with a hash type index on which queries performing a sequential search or selecting a range of values or a partial match are frequently performed. The identified column may be a column with a binary tree type index on which queries using an exact match are frequently performed.

At step 204, the database index management system 101 may add, remove, or modify an index of the identified column. Adding an index of the identified column may include adding an index to the identified column. Removing an index for the identified column may include removing an existing index from the identified column. Changing an index of the identified column may include changing the index type of an index already existing for the column to a hash index, a GiST index, or a binary tree index.

Figure 3:
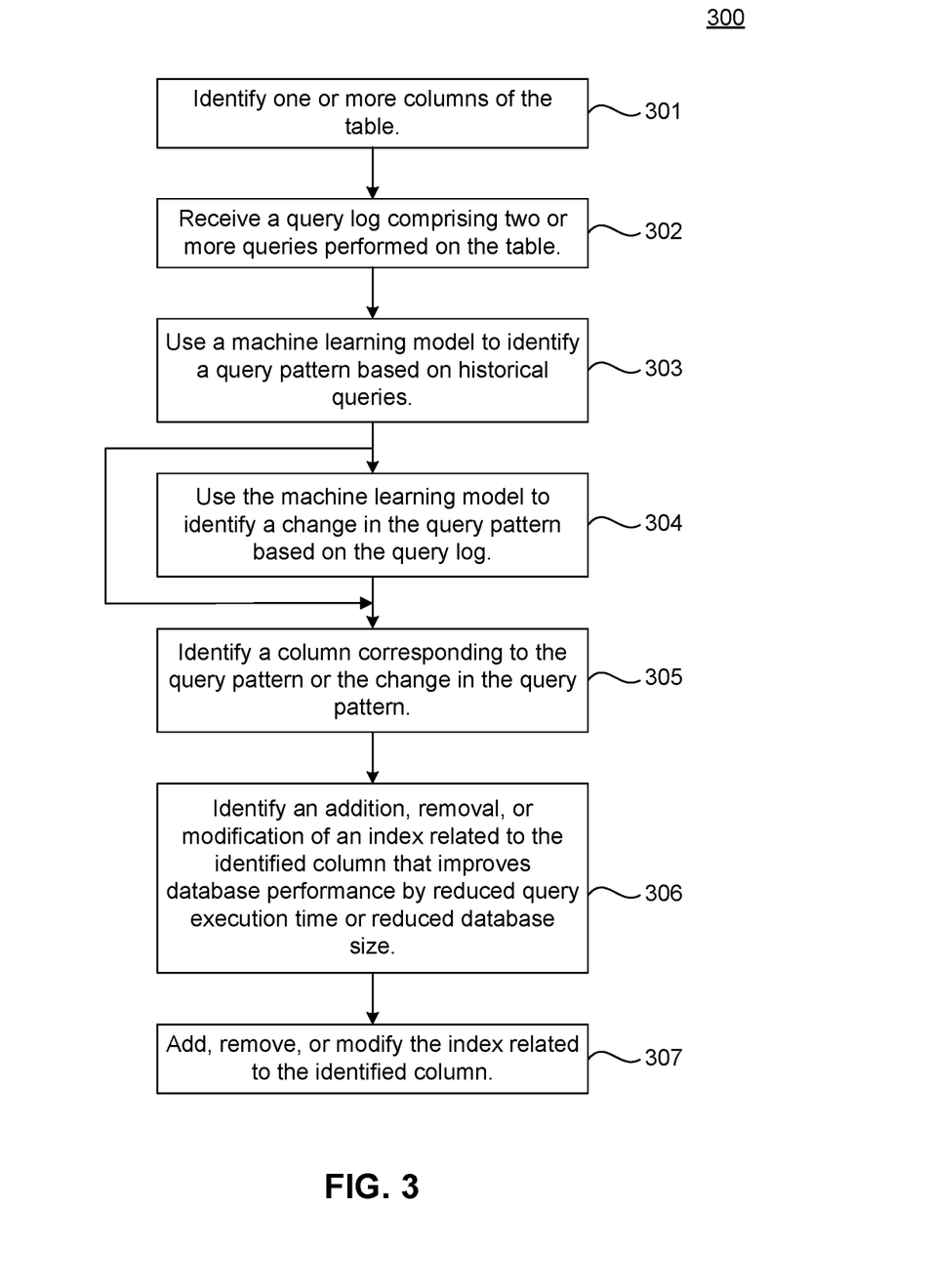
FIG. 3 is a flow chart illustrating a non-limiting process for database index management using a machine learning model according to some embodiments disclosed herein.

FIG. 3 is a flow chart illustrating a non-limiting process for database index management using a machine learning model according to some embodiments disclosed herein. In a non-limiting example, a machine learning model may be trained using logs of actions performed by database administrators and configured to make decisions about adding, removing, or modifying indices in a database that mimic the decisions made by database administrators. Some advantages of using a machine learning model to make index addition, removal, or modification decisions include rapid response to changes in patterns of database usage and the ability to identify a greater number of opportunities for improving database performance.

At step 301, the database index management system 101 may identify one or more columns of a table in the database 105. At step 302, the database index management system 101 may receive a query log 111. The query log 111 may include one, two, or more queries that were performed on the table. The query log 111 may be filtered or processed to include a subset of the queries performed on the database 105. Step 301 and step 302 may be performed according to any of the embodiments disclosed herein.

At step 303, the database index management system 101 may use a machine learning model 102 to identify a query pattern based on historical queries. Queries may be analyzed by the machine learning model in aggregate. Some queries may be received from a database administrator (DBA) and may include actions to create or remove an index from a column. These action queries may be treated separately from other queries, such as select queries. The machine learning model may learn, from the action queries, which patterns in the query log are associated with a corresponding modification to an index of a table, and what modifications 112 should be performed. In this manner, the training of a machine learning model may be supervised through the day to day performance of administrative tasks by DBAs. A machine learning model 102 may identify a pattern in the query log 111 based on one or more of the queries executed, execution plans for the queries, one or more indices used in the queries, types of the one or more indices, frequency of queries performed on a column over a defined period of time, and/or execution time of the queries. At the completion of step 303, method 300 proceeds to step 304 or, if changes in the query pattern do not need to be identified, method 300 proceeds to step 305.

At step 304, the database index management system 101 may use the machine learning model 102 to identify a change in the query pattern based on the query log 111. As database usage changes over time, queries may no longer make significant use of one or more columns that are indexed. Over time, queries may also increase use of one or more columns that are un-indexed. Under these circumstances, the machine learning model 102 may identify a change in the query pattern comprising a decrease in the frequency of queries involving an indexed column or an increase of queries involving an un-indexed column.

The database index management system 101 may be configured to add, remove, or modify an index in a database based on patterns identified in the query log in step 303. The database index management system 101 may select index additions, removals, or modifications that are expected to improve performance, according to the training of the machine learning model 102. The database index management system 101 may also be configured to add, remove, or modify an index in the database in response to changes in the query patterns, identified in step 304, that occur over time.

At step 305, the database index management system 101 may identify a column corresponding to a query pattern identified in step 303 or a change in the query pattern identified in step 304. The machine learning model may identify a column where the query pattern or the change in the query pattern represents high or increased usage of the identified column in, for example and without limitation, WHERE clauses or JOIN operations. The machine learning model 102 may identify the column based on previously identified patterns that have been associated with action queries from DBAs, such as adding an index, removing an index, or changing an index type.

At step 306, the database index management system 101 may identify an addition, removal, or modification of an index related to the identified column. The machine learning model 102 may associate a type of index to create with a data type of the identified column and a structure of the queries. As a non-limiting example, a first column may store social security numbers as a text data type, and queries performed on social security numbers may frequently involve an exact match. A second column may store a date of birth as a date and queries performed on the date of birth may frequently involve a partial match or a range of values. The machine learning model 102 may create a hash type index on the first column storing social security numbers, and the machine learning model 102 may create a binary tree (b-tree) index on the second column storing dates of birth.

The identified modification of step 306 may improve database performance by reducing query execution time or reducing database size. Reduced query execution time may occur, for example and without limitation, when an index is added to the non-indexed identified column in response to a high or increased frequency of queries, in the query log 111, that JOIN tables using the identified column, or a high or increased frequency of queries that include the identified column in a WHERE clause. Reduced query execution time may also occur as a result of changing the index type when the identified column is indexed with a hash type index and the query log 111 includes a high or increased frequency of queries performed on the identified column that require a sequential search, a partial match, or return a range of values. Reduced query execution time may also occur when the identified column is indexed with a binary tree type index and the query log 111 includes a high or increased frequency of queries performed on the identified column that require an exact match. Reduced database size may result from removing an index from the identified column in response to a low or decreased frequency of the identified column appearing in JOIN operations or WHERE clauses in queries of the query log 111.

A JOIN operation may refer to a join operation in relational algebra. There are many types of join operations. In a non-limiting example, a join operation creates a new table from the records of two tables that have one or more columns in common. The new table may include all the records that have matching values in the common columns of both tables. A skilled person would understand the variety of different join operations that may be performed in relational databases.

A WHERE clause may be used to perform a filter operation on data in a column by comparing or matching the data to a value in the WHERE clause. As a non-limiting example, a SQL statement "SELECT*FROM customer_table WHERE customer_table.name='Smith'" would select all records where the name field is "Smith" from the table, customer_table. A WHERE clause is part of Structured Query Language (SQL) commonly used to interact with databases and those skilled in the art would be familiar with the concept of filtering and using filtering language, such as the WHERE clause, when working with a database.

At step 307, the database index management system 101 may send one or more modifications 112 to the database. The database index management system 101 may perform multiple modifications 112.

Figure 4:
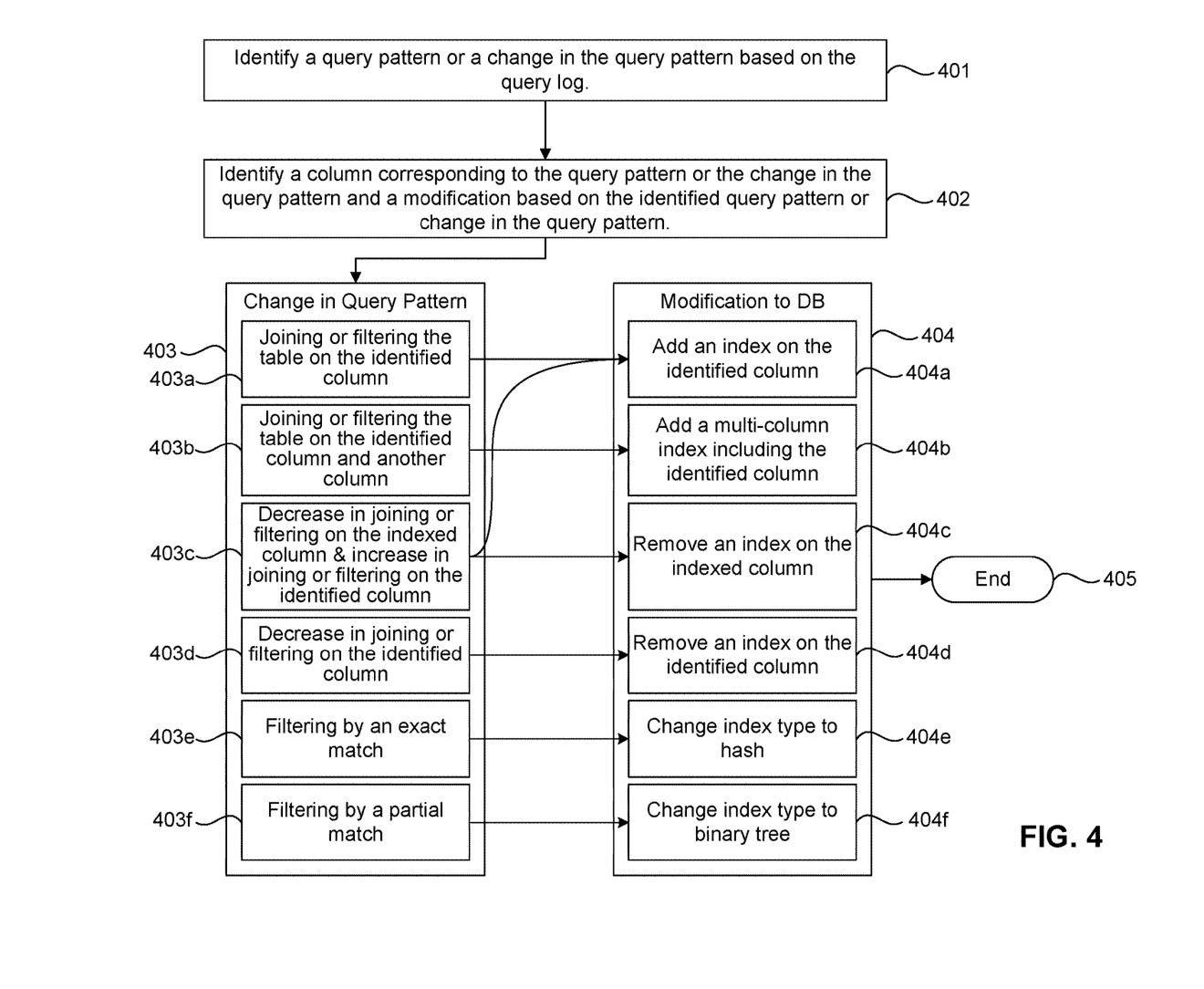
FIG. 4 is a flow chart illustrating a non-limiting example of database index changes corresponding to various query patterns or changes in query patterns according to some embodiments disclosed herein.

FIG. 4 is a flow chart illustrating a non-limiting example of database index changes corresponding to various query patterns or changes in query patterns according to some embodiments disclosed herein.

At step 401, the database index management system 101 may identify a query pattern or a change in the query pattern based on the query log 111. At step 402, the database index management system 101 may identify a column corresponding to the query pattern or the change in the query pattern. The database index management system 101 may identify a modification of the database 105 that is appropriate based on the identified query pattern or the change in the query pattern. The modification may include adding, removing or modifying an index for a table of the database 105. The database index management system 101 may use one or more machine learning models 102 to identify the query pattern or the change in the query pattern, to identify the column corresponding to the query pattern or the change in the query pattern, or to identify the addition, removal, or modification of the index. The identifying of a query pattern or a change in the query pattern represented by step 401 and the identification of a column corresponding to the query pattern or the change in the query pattern represented by step 402 may be performed according to any of the embodiments disclosed herein.

At step 403 and step 404, various query patterns, or changes in the query pattern are associated with index additions, removals, or modifications that may improve database performance. The illustrated portions of steps 403 and 404 are not exhaustive and only presented to illustrate non-limiting examples of what patterns may be detected and what modifications may be made.

In response to a query pattern or a change in the query pattern 403a related to join or filter operations performed with the identified column, the machine learning model 102 may identify a modification 404a that adds an index to the identified column. In response to a query pattern or a change in the query pattern 403b related to join or filter operations performed with the identified column and another column of the same table, the machine learning model 102 may identify a modification 404b that adds a multi-column index to the identified column and the other column. In response to a query pattern or a change in the query pattern 403c related to a low or decreased frequency of join or filter operations performed with an indexed column and a high or increased frequency of join or filter operations performed with the identified column, the machine learning model 102 may select a modification 404a that adds an index to the identified column and a modification 404c that removes an index from the indexed column. In response to a query pattern or a change in the query pattern 403d related to a low or decreased frequency of join or filter operations performed with the identified column, the machine learning model 102 may identify a modification 404d that removes an index from the identified column.

In response to a query pattern or a change in the query pattern 403e related to filtering the identified column by an exact match, the machine learning model 102 may identify a modification 404e that changes the index type to a hash index. In response to a query pattern or a change in the query pattern 403f related to a sequential search or filtering the identified column by a partial match or a range of values, the machine learning model 102 may identify a modification 404f that changes the index type to a binary tree index. In some database systems, filtering may be performed using a WHERE clause on a particular column or multiple columns.

The process of identifying a modification may end at 405.

Figure 5:
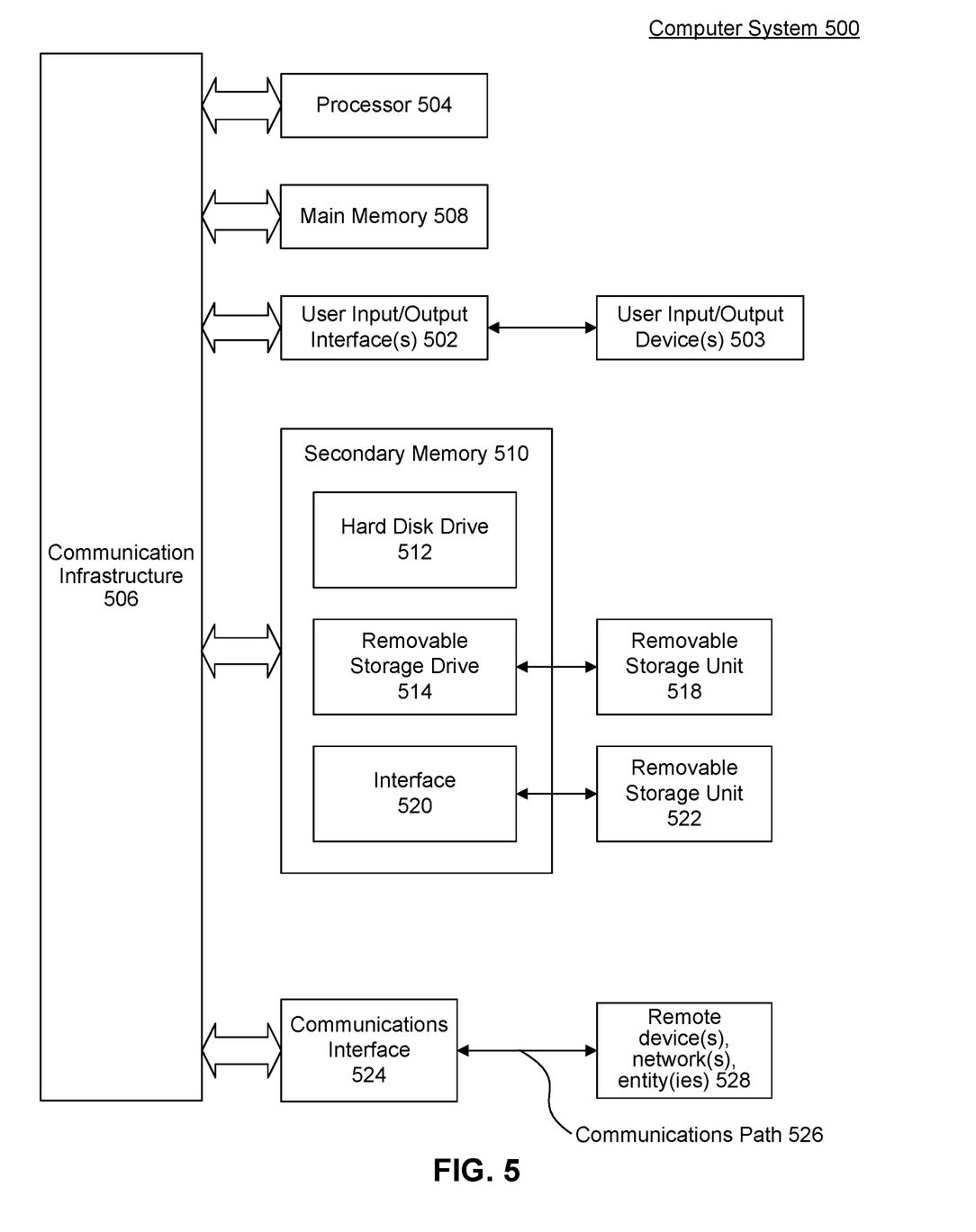
FIG. 5 is a block diagram of a non-limiting example computer system useful for implementing various embodiments disclosed herein.

FIG. 5 is a block diagram of a non-limiting example computer system useful for implementing various embodiments disclosed herein.

Various embodiments may be implemented, for example and without limitation, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache and/or registers. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of modifying an index of a table in a relational database, the method comprising:
    identifying, by a processor, one or more columns of the table;
    receiving a query log comprising two or more queries performed on the table;
    analyzing the query log using a machine learning model to identify, among the one or more columns, a column for which an index is to be added, removed or modified; and
    adding, removing, or modifying the index for the identified column,
    wherein the analyzing of the query log to identify the column comprises:
    using the machine learning model to identify a query pattern for the table based on historical queries;
    using the machine learning model to identify a change in the query pattern based on the query log; and
    setting, as the identified column, a column corresponding to the change in the query pattern.

2. The method of claim 1, wherein adding, removing, or modifying the index for the identified column comprises one or more of:
    adding the index to the identified column;
    removing the index from the identified column;
    adding a multi-column index using the identified column and another column of the table;
    changing the index of the identified column to a hash index;
    changing the index of the identified column to a generalized search tree index; or
    changing the index of the identified column to a binary tree index.

3. The method of claim 1, wherein the analyzing of the query log to identify the column for which an index is to be added, removed, or modified comprises identifying an addition, removal, or modification that improves database performance, based on the change in the query pattern, by one or more of:
    reduced query execution time; or
    reduced database size.

4. The method of claim 1, wherein the change in the query pattern comprises one or more queries of the query log performing a join or a filter operation on the table at the identified column, and
    wherein adding, removing, or modifying the index comprises adding an index to the identified column.

5. The method of claim 1, wherein the change in the query pattern comprises one or more queries of the query log performing a join or a filter operation on the table at the identified column and another column of the table, and
    wherein adding, removing, or modifying the index comprises adding a multi-column index using the identified column.

6. The method of claim 1, wherein the change in the query pattern comprises:
    an increase in queries performing a join or a filter operation on the table at the identified column; and
    a decrease in queries performing a join or a filter operation on the table at an indexed column of the table, and
    wherein adding, removing, or modifying the index comprises:
    removing an index from the indexed column, and
    adding an index to the identified column.

7. The method of claim 1, wherein the change in the query pattern comprises a decrease in queries performing a join or a filter operation on the table at the identified column, and
    wherein adding, removing, or modifying the index comprises removing an index from the identified column.

8. The method of claim 1, wherein the change in the query pattern comprises one or more queries of the query log selecting records from the table based on an exact match between an expression and the records at the identified column; and
    wherein adding, removing, or modifying the index comprises changing the index to a hash index.

9. The method of claim 1, wherein the change in the query pattern comprises one or more queries of the query log selecting records from the table based on a partial match between an expression and the records at the identified column; and
    wherein adding, removing, or modifying the index comprises changing the index to a binary tree index.

10. A system for adding, removing, or modifying an index of a table in a relational database, the system comprising:
    a machine learning model; and
    a processor and memory configured to:
    identify one or more columns of the table;
    receive a query log comprising two or more queries performed on the table;
    analyze the query log, using the machine learning model, to identify, among the one or more columns, a column for which an index is to be added, removed, or modified; and
    add, remove, or modify the index of the identified column,
    wherein the processor and memory are further configured to:
    use the machine learning model to identify a query pattern for the table based on historical queries;
    use the machine learning model to identify a change in the query pattern based on the query log; and
    set, as the identified column, a column corresponding to the change in the query pattern.

11. The system of claim 10, wherein adding, removing, or modifying the index comprises one or more of:
    adding the index to the identified column;
    removing the index from the identified column;

adding a multi-column index using the identified column and another column of the table;

changing the index of the identified column to a hash index;

changing the index of the identified column to a generalized search tree index; or changing the index of the identified column to a binary tree index.

12. The system of claim 10, wherein the processor and memory are further configured to use the machine learning model to identify an addition, removal, or modification of the index for the identified column that improves database performance, based on the change in the query pattern, by one or more of:

reduced query execution time; or reduced database size.

13. The system of claim 10, wherein the change in the query pattern comprises one or more queries of the query log performing a join or a filter operation on the table at the identified column, and wherein the processor and memory are further configured to add, remove, or modify the index by adding the index to the identified column.

14. The system of claim 10, wherein the change in the query pattern comprises one or more queries of the query log performing a join or a filter operation on the table at the identified column and another column of the table, and wherein the processor and memory are further configured to add, remove, or modify the index by adding a multi-column index using the identified column.

15. The system of claim 10, wherein the change in the query pattern comprises:

an increase in queries performing a join or a filter operation on the table at the identified column; and a reduction in queries performing a join or a filter operation on the table at an indexed column of the table, and wherein the processor and memory are further configured to add, remove, or modify the index by:

removing an existing index from the indexed column, and adding the index to the identified column.

16. The system of claim 10, wherein the change in the query pattern comprises a reduction in queries performing a join or a filter operation on the table at the identified column, and wherein the processor and memory are further configured to add, remove, or modify the index by removing the index from the identified column.

17. The system of claim 10, wherein the change in the query pattern comprises one or more queries of the query log selecting records from the table based on an exact match between an expression and the records at the identified column; and wherein the processor and memory are further configured to add, remove, or modify the index by changing the index of the identified column to a hash index.

18. The system of claim 10, wherein the change in the query pattern comprises one or more queries of the query log selecting records from the table based on an partial match between an expression and the records at the identified column; and wherein the processor and memory are further configured to add, remove, or modify the index by changing the index of the identified column to a binary tree index.

* * * * *